United States Patent [19]

Hiramatsu

[11] Patent Number: 5,755,505

[45] Date of Patent: May 26, 1998

[54] LIGHT SOURCE ASSEMBLY AND BULB UNIT THEREFOR

[75] Inventor: Hiromi Hiramatsu, Anjo, Japan

[73] Assignee: Denso Corporation, Kariya, Japan

[21] Appl. No.: 784,899

[22] Filed: Jan. 16, 1997

[30] Foreign Application Priority Data

Jan. 19, 1996 [JP] Japan ................... 8-007742

[51] Int. Cl.⁶ ................................................. F21V 7/04
[52] U.S. Cl. ................... 362/32; 362/265; 362/61; 362/263; 362/310
[58] Field of Search ............................ 362/32, 265, 263, 362/310, 61

[56] References Cited

U.S. PATENT DOCUMENTS

| | | | |
|---|---|---|---|
| 3,427,447 | 2/1969 | Clark | 362/299 |
| 3,751,655 | 8/1973 | Clark | 362/32 |
| 4,009,381 | 2/1977 | Schreiber et al. | 362/32 |
| 5,130,911 | 7/1992 | Eisner, Sr. | 362/263 X |
| 5,130,912 | 7/1992 | Friederichs et al. | 362/263 |
| 5,222,793 | 6/1993 | Davenport et al. | 362/32 |
| 5,258,686 | 11/1993 | Segoshi et al. | 362/61 X |
| 5,321,586 | 6/1994 | Hege et al. | 362/32 |
| 5,416,669 | 5/1995 | Kato et al. | 362/32 |
| 5,436,806 | 7/1995 | Kato | 362/32 |
| 5,488,545 | 1/1996 | Kato et al. | 362/32 |
| 5,560,699 | 10/1996 | Davenport et al. | 362/32 |
| 5,567,032 | 10/1996 | Heizmann | 362/32 X |
| 5,575,551 | 11/1996 | Horii | 362/32 |
| 5,607,228 | 3/1997 | Ozaki et al. | 362/61 X |

FOREIGN PATENT DOCUMENTS

| | | |
|---|---|---|
| 4-107208 U | 9/1992 | Japan . |
| 6058506 U | 8/1994 | Japan . |
| A-7-6603 | 1/1995 | Japan . |

*Primary Examiner*—Ira S. Lazarus
*Assistant Examiner*—Nhat-Hang H. Lam
*Attorney, Agent, or Firm*—Nixon & Vanderhye P.C.

[57] ABSTRACT

A light source assembly has a housing and a bulb unit disposed in the housing. The housing is made of an electromagnetic shielding material. The bulb unit is composed of a reflector made of an insulating material, a bulb accommodated in the reflector, a connector connecting the bulb to a control circuit and fixing it to the reflector and light transmitting windows formed in the reflector. The bulb is disposed in the reflector so as to cross the axis of the light transmitting windows. The connector projects to the outside from the reflector to be coupled or decouple with a connector of the control circuit.

8 Claims, 12 Drawing Sheets

5,755,505

1

LIGHT SOURCE ASSEMBLY AND BULB UNIT THEREFOR

BACKGROUND OF THE INVENTION

1. Field of the Invention

The present invention relates to a light source assembly and an electric bulb unit installed in the light source assembly.

2. Description of the Related Art

JPA 7-6603 discloses a light source assembly which is composed of a bulb unit, a control circuit and a circuit board. The bulb unit has an electric discharge lamp (bulb) such as a metal halide lamp, a reflector which accommodates the bulb therein and is provided with a pair of light transmitting windows formed therein. The reflector is made of an electricity-conductive material to suppress high frequency noises emitted from the bulb to the outside. The light transmitting windows receive therein incident portions of a pair of optical cables, which transmit the light from the bulb to a pair of projector lens units disposed respectively at both sides of the front portion of a vehicle to illuminate areas in front of the vehicle. The control circuit controls power supplied to the bulb. The bulb and the control circuit are connected by the circuit board, which is covered by a shield plate for shielding high frequency noises.

The circuit board is integrally fixed with the bulb unit. Hence if the bulb is to be changed, the circuit board must be changed at the same time, resulting in a high replacement cost.

In addition, the shield plate covering the circuit board must be replaced at that time.

Because the bulb of the bulb unit of the above light source assembly is accommodated in the reflector which is made of a conductive material, the bulb must be located closely by the reflector. Accordingly, if the reflector is made compact, a high voltage current may leak from the high voltage terminal (anode) of the bulb to the reflector, and the bulb may fail in lighting. Thus, it is difficult to make the bulb unit compact.

SUMMARY OF THE INVENTION

The present invention, in view of the above problems, has an object of providing a light source assembly which is easy to replace the bulb at a low cost.

Another object of the present invention is providing a compact bulb unit for a light source assembly.

In a light source assembly according to the present invention, the reflector is provided with a detachable connector which projects to the outside, so that the bulb can be replaced as a bulb unit. The replacement cost of the bulb is therefore reduced and replacement work becomes simple. Because the bulb unit is accommodated in a housing made of electromagnetic shielding material, high frequency noises can be shielded.

In a bulb unit according to the present invention, a reflector is made of an insulating material so that the reflector can be made compact without leakage of the high tension voltage from the high-side terminal (anode) of the bulb to the reflector even if the bulb is located near the reflector. The bulb is fixed to the connector securely at one end thereof and disposed in the reflector so that the axis of the light transmitting windows cross the center of the bulb. Because the connector functions not only to connect the bulb electrically but also supports the bulb, the bulb supporting structure is simple. The connector projects from the reflector to the outside and coupled with a female connector of the control circuit, and thereby the wiring circuit is simplified.

In a light source assembly according to the present invention, the reflector is provided with cylindrical portions and are held in grooves formed inside the housing. The reflector is therefore automatically positioned in the housing, and alignment of the axis of the optical cables with the axis of the light transmitting windows can be carried out easily, thereby increasing the light transmitting efficiency.

In a light source assembly according to the present invention, the reflector has an upper opening and a spring plate disposed compressively on a flat portion around the upper opening between the reflector and the housing thereby to cover the upper opening. The reflector is therefore held securely by the spring plate and the housing. A heat radiating passage is formed between the spring plate and the flat portion of the reflector to connect the inside of the reflector to the outside thereof. The heat of the bulb can be therefore radiated from the reflector to the outside, thereby suppressing the temperature rise of the reflector.

In a light source assembly and its bulb unit according to the present invention, the anode terminal is disposed inside the connector body made of an insulating material; and the cathode terminal is disposed outside the connector body. The anode terminal and the cathode terminal are therefore insulated surely.

In a light source assembly and its bulb unit according to the present invention, the anode terminal is disposed within an end of the connector body. The anode terminal is therefore protected by the connector body when the connector is coupled with the female connector of the control circuit, thereby protecting the anode terminal from damage.

In a light source assembly according to the present invention, protecting rings are disposed respectively around the cylindrical portions. The cylindrical portions are therefore protected from damage.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
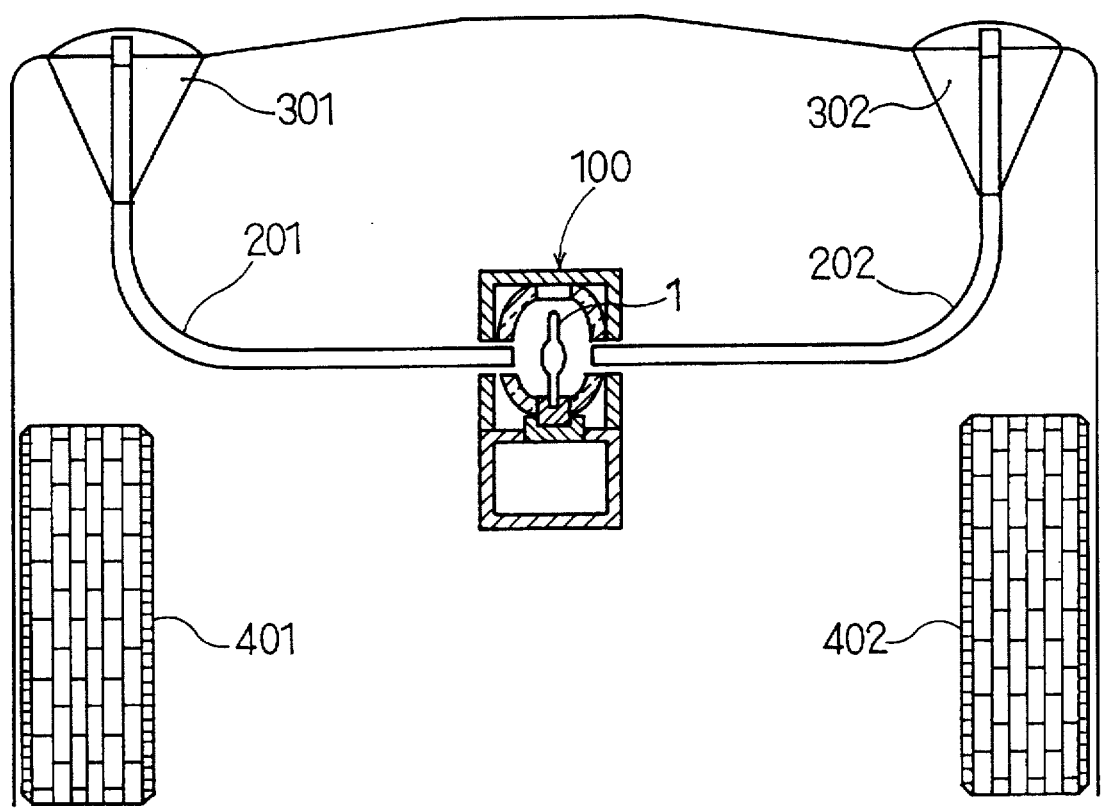
FIG. 1 is a schematic view illustrating an automobile headlamp system which is equipped with a light source assembly.

In the automobile headlamp system shown in FIG. 1, lights emitted from a light bulb 1 of a light source assembly 100 are transmitted through a left optical cable 201 to a left projector lens 301 and through a right optical cable 202 to a right projector lens 302 so that the lights are projected through both projector lenses 301 and 302 to illuminate areas ahead of the automobile. A reference numeral 401 indicates a left wheel and a reference numeral 402 indicates a right wheel.

Figure 2:
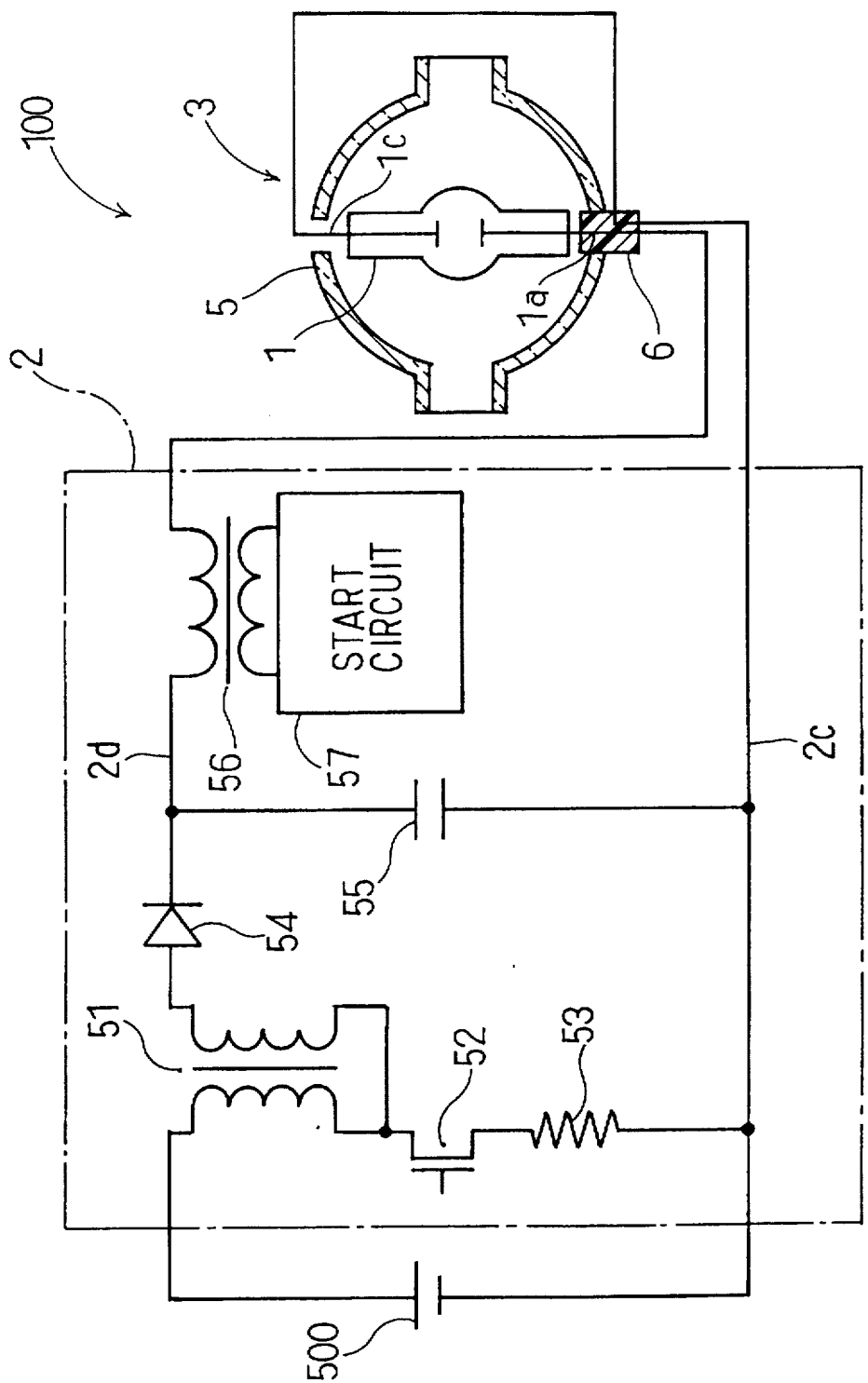
FIG. 2 is a schematic circuit diagram of the power supply system of the light source assembly shown in FIG. 1.

A power supply system shown in FIG. 2 has an on-vehicle battery 500 and a control circuit 2, which includes a DC/DC converter for increasing the battery voltage to energize the bulb 1. The control circuit 2 is composed of a transformer 51, a switch member 52 for switching on and off the primary current of the transformer 51 according to a PWM (pulse width modulation) signal sent from a pulse control circuit (not shown), a current limit resistor 53 connected in series with the switch member 52, a diode 54 for rectifying the secondary current of the transformer 51, a capacitor 55 for smoothing the current rectified by the diode 54 to be applied across a high side electrode (anode) 1a and a low-side electrode 1c (cathode) of the bulb 1, a high tension transformer 56 for applying high voltage pulse across a pair of the electrodes 1a and 1c to start discharging of the bulb 1 and a starting circuit 57 for supplying a primary current to the primary coil of the high tension transformer 56 to generate the high voltage pulse.

(First Embodiment)

The light source assembly according to a first embodiment is described with reference to FIGS. 3–10 hereafter.

The light source assembly 100 is composed of a light bulb unit 3, a housing 4 and the control circuit 2.

Figure 8:
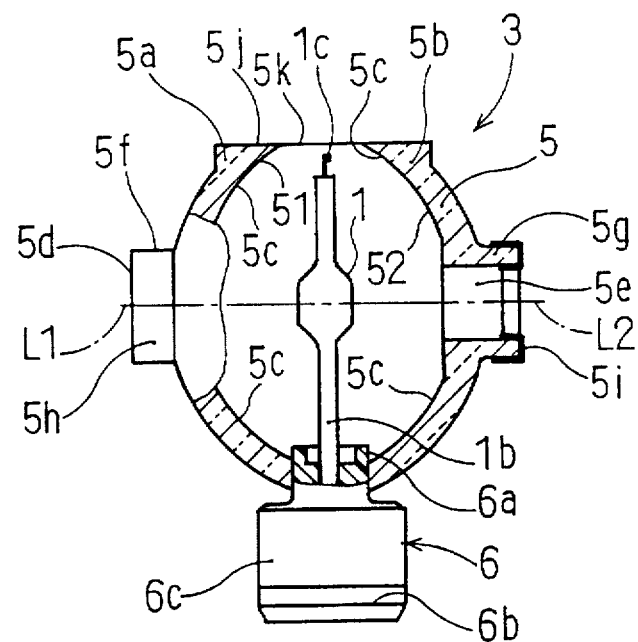
FIG. 8 is a cross-sectional view illustrating a bulb unit shown in FIG. 4 and FIG. 6.
Figure 9:
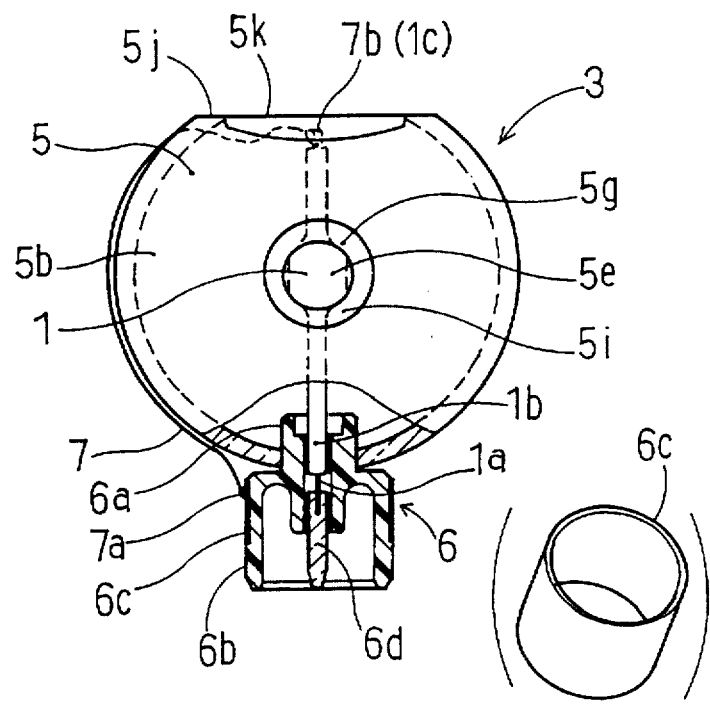
FIG. 9 is a cross-sectional view illustrating the bulb unit shown in FIG. 5 and FIG. 7.
Figure 10:
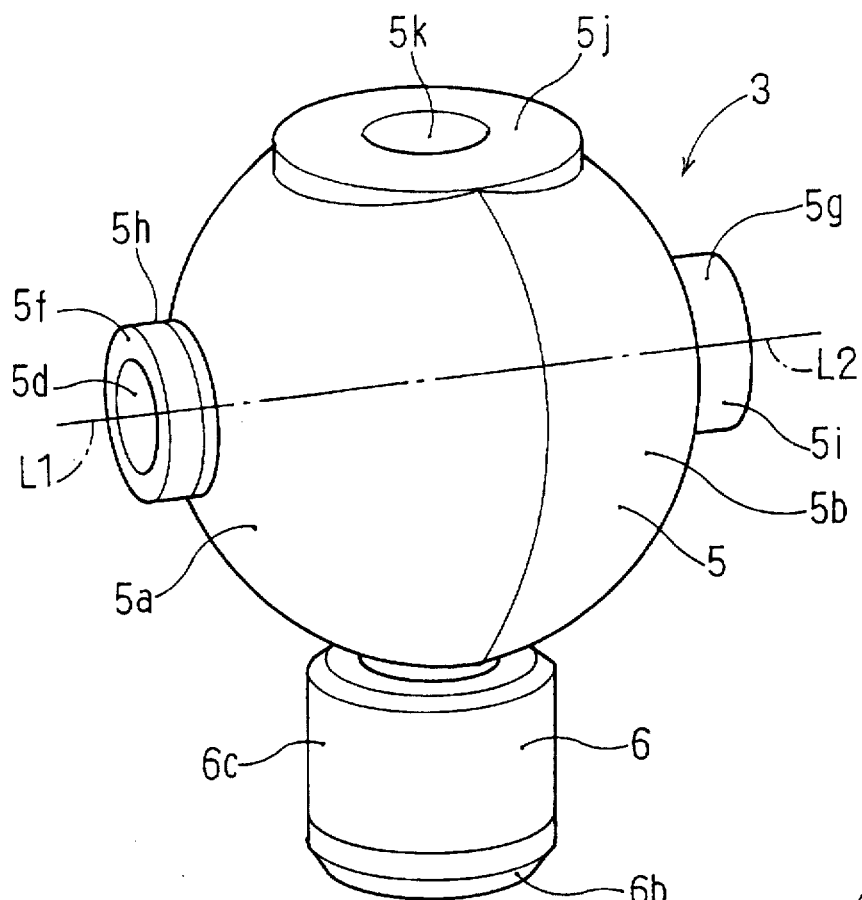
FIG. 10 is a perspective view illustrating the bulb unit according to the first embodiment.

The bulb unit 3 is composed of the bulb 1, a reflector 5 which accommodates the bulb 1 and a connector 6 fixed to the reflector 5 as shown in FIG. 8–10.

The bulb 1 is a discharge lamp such as a metal halide lamp. The bulb 1 has a glass envelope, a light emitting convex member disposed in the glass envelope and a pair of the electrodes 1a and 1c extending from the opposite ends of the glass envelope. An end portion 1b of the glass envelope on the high-side electrode (anode) 1a is bonded to an upper portion of an inner periphery of a cylindrical member 6a of a connector 6 by cement or the like, and an edge of the anode 1a is welded to a male anode terminal 6d. The anode terminal 6d is bonded to a lower portion of the inner periphery of the cylindrical member 6a and extends downward therefrom.

The reflector 5 is composed of a pair of heat resistant glass members 5a and 5b forming together a receptacle the inner periphery of which has an elliptic cross-section. The glass members are bonded by cement or the like. Non-metallic reflecting film 5c such as SiC film is formed on the inner peripheries of the glass members 5a and 5b by means of the vapor deposit or the like to provide two reflecting surfaces 51 and 52. Each of the glass members 5a and 5b has a light transmitting window 5d or 5e in which a light incident portion 201a or 202a of the optical cable 201 or 202 is inserted. The light transmitting windows 5d and 5e are formed on the inner peripheries of cylindrical portions 5f and 5g respectively and disposed to face and aligned with each other to have a common axis L1–L2 passing through the center of the reflector 5. Stainless tubular covers 5h and 5i are fitted respectively to the cylindrical portions 5f and 5g to protect them from damage. The reflecting surfaces 51 and 52 of the reflector 5 are formed to be symmetrical to have the same common axis as the axis L1–L2 of the light transmitting windows 5d and 5e. That is, the axis of the reflecting surfaces is located right on the incident lights of the cables 201 and 202. For this purpose, the reflecting surface 51 is formed into the elliptic surface which has one of the two focuses positioned at the light emitting member and the other positioned at the light incident portion of the optical cable 202. The reflector 5 has a lower opening formed at the bottom thereof vertical to the common axis L1–L2 to hold the connector 6 and an upper opening 5k and a flat portion 5j around the upper opening 5k formed at the top of the reflector opposite the connector 6. Because the upper opening is located right above the light emitting member of the bulb 1, heat radiation and connection of the lead wire 7 to the cathode of the bulb are carried out effectively and easily.

The light emitting member of the bulb 1 is positioned on the axis of the two light transmitting windows of the reflector 5, and the reflecting surfaces 51 and 52 of the reflector 5 are formed as described above. Hence the light emitted from the light emitting member can be transmitted to the optical cables 201 and 202 at a high efficiency. In addition to the reflecting surface and the position of the light incident portion of the optical cable, the incidence angle of the light upon the light incident potions 201a and 202a of the optical cable, in other words, the optical open angle of the optical cable, is determined so that the light reflected by the reflecting surface can be transmitted to the optical cable at a high efficiency.

The connector 6 is fixed to the lower opening of the reflector by cement or the like. The connector 6 has a connector body made of a heat-resistant insulating material such as ceramic. The connector body has the cylindrical portion 6a and a cup 6b which is formed coaxially with the cylindrical portion. The cup 6b projects downward from the reflector 5 and surrounds the anode terminal 6d extending downward from the cylindrical portion 6a. The open end (bottom) of the cup 6b is located to cover and protect the edge of the anode terminal 6d. A thin annular cathode terminal 6c is fitted elastically to the outer periphery of the cup 6b, and one end 7a of a lead wire 7 extending along the outer periphery of the reflector is fixed on the annular cathode terminal 6c by welding or the like. The other end 7b of the lead wire 7 extends to the inside of the reflector 5 through the upper opening thereof and is connected to the cathode 1c of the bulb 1. Thus, the cathode terminal 6c and the cathode 1c are connected by the lead wire 7 shown in FIG. 9. The lead wire 7 is composed of a bare heat-resistant wire such as a nickel wire, however a wire with a heat-resistant coating such as Teflon can be used. The anode terminal 6d is disposed inside the insulating cup 6b, and the cathode terminal 6c is disposed on the outer periphery of the cup 6b. Accordingly, the anode terminal 6d and the cathode terminal 6c are insulated from each other by the cup 6b, which is made of an insulating material.

The housing 4 has a housing body 4a and a cover 4b as shown in FIGS. 3–7.

Figure 3:
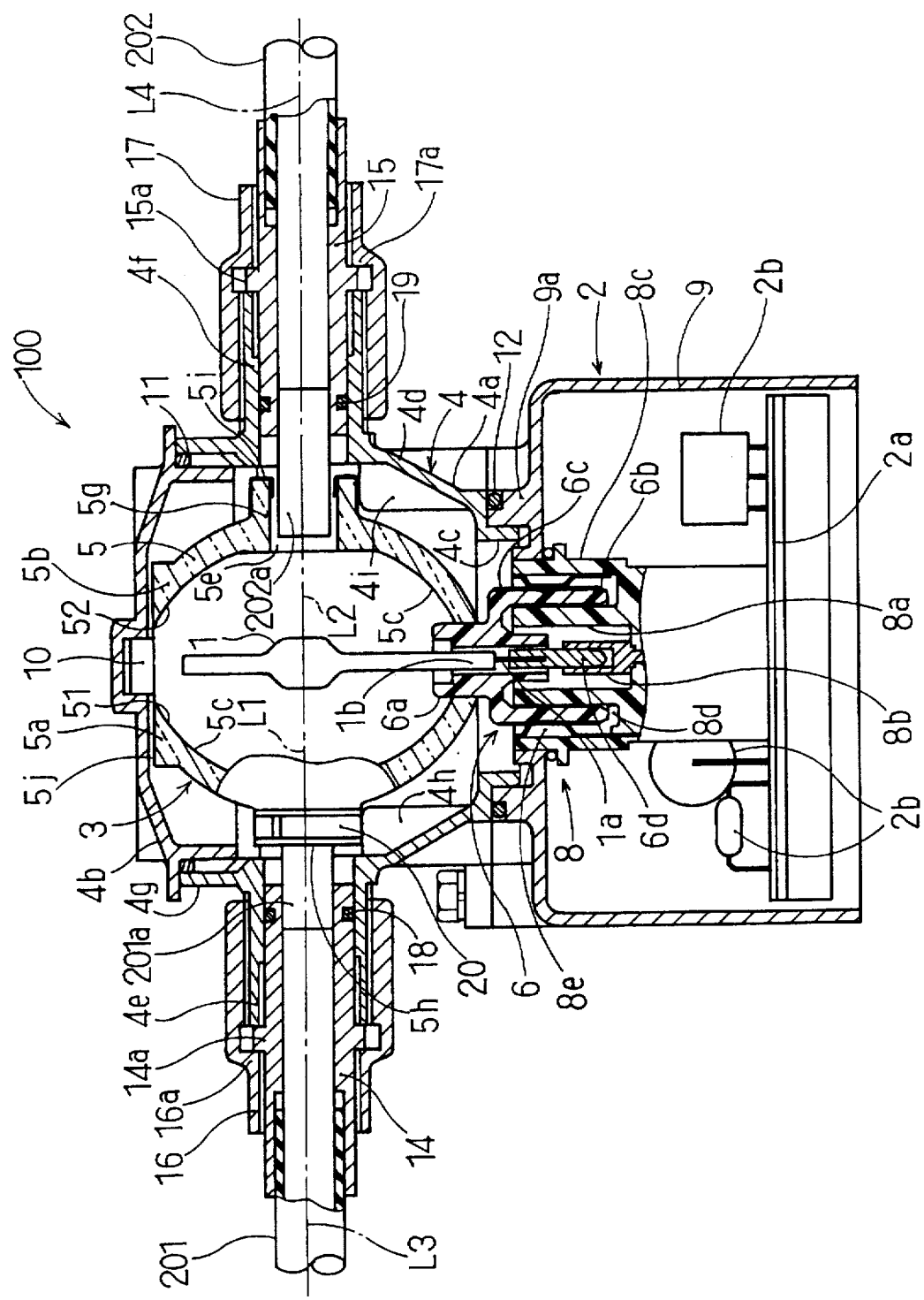
FIG. 3 is a cross-sectional view illustrating a light source assembly having optical cables according to a first embodiment.
Figure 4:
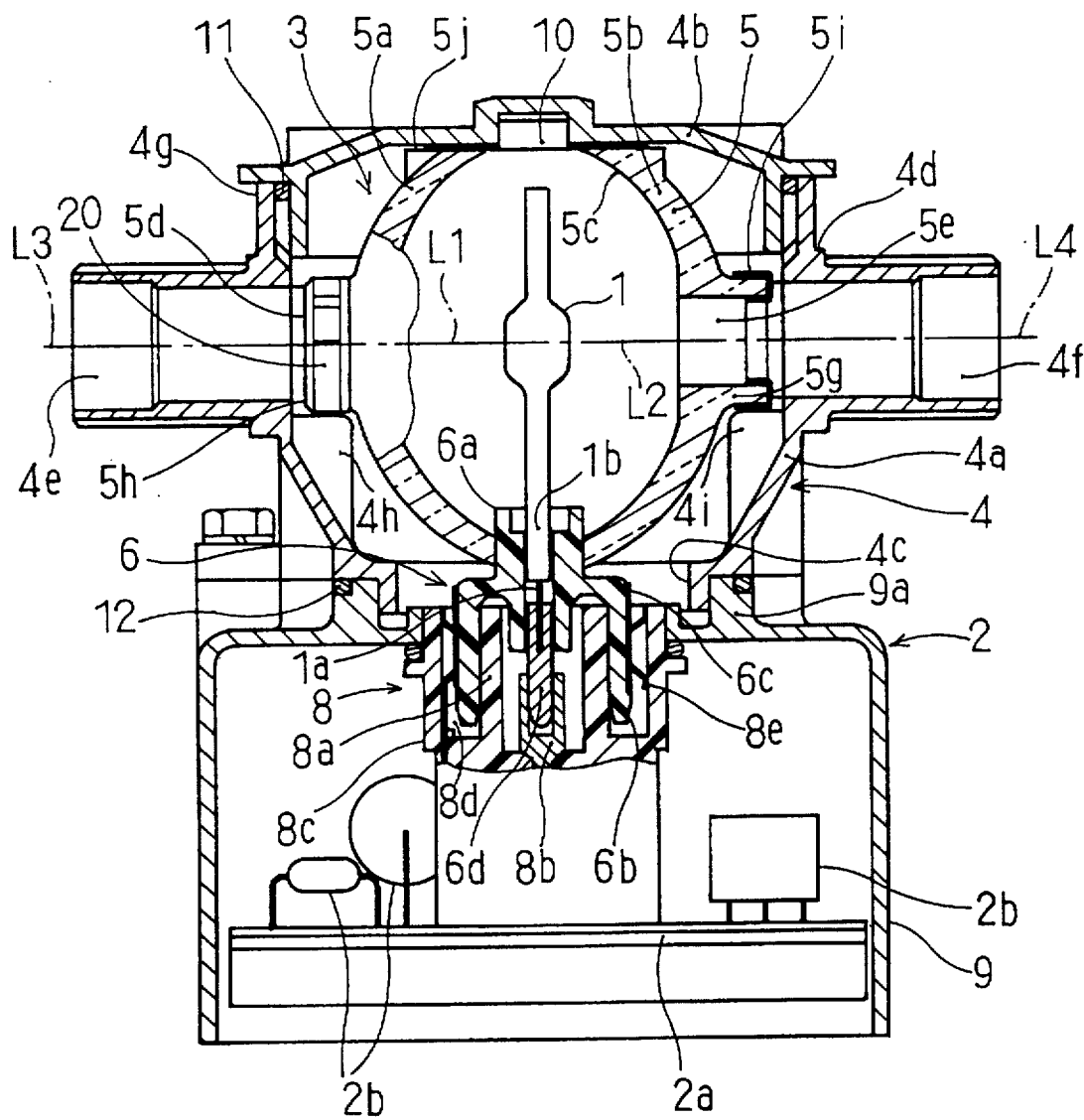
FIG. 4 is a cross-sectional view illustrating the light source assembly without the optical cables according to the first embodiment.
Figure 5:
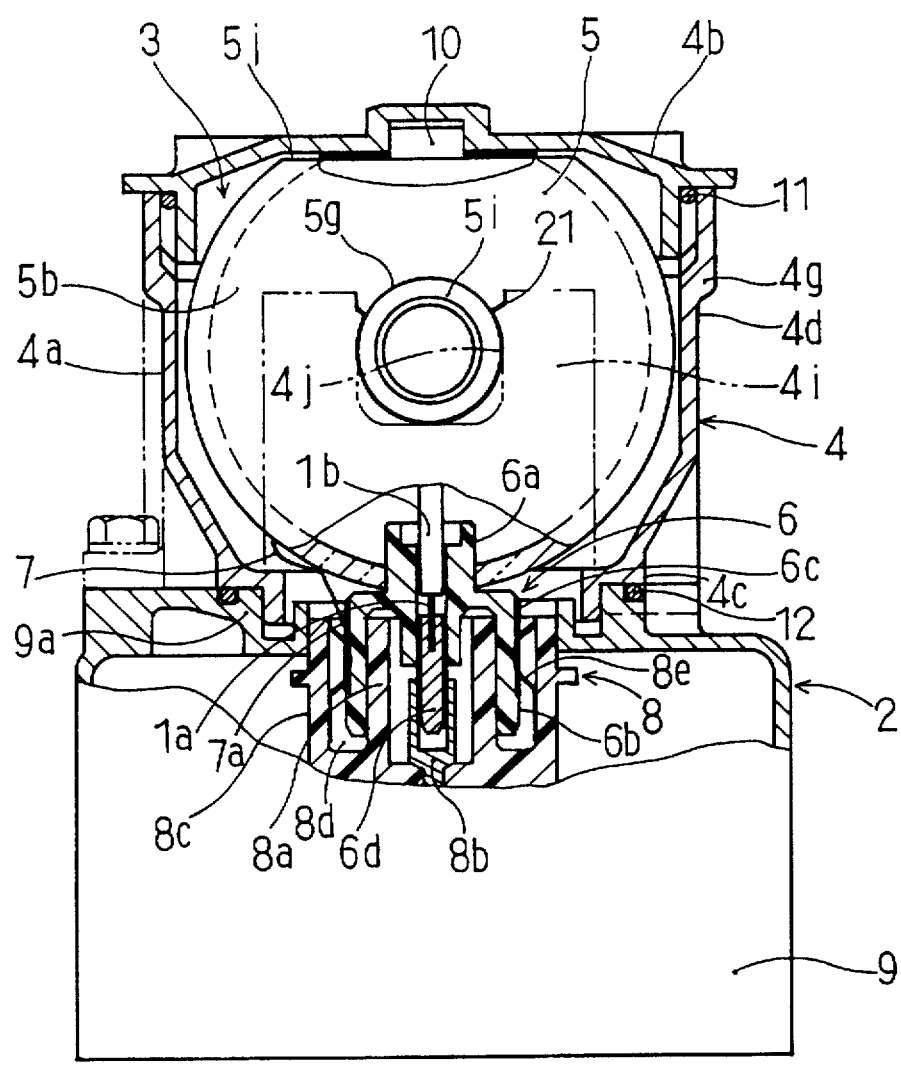
FIG. 5 is a cross-sectional view illustrating the light source assembly cut along a plane perpendicular to the plane of cutting in FIG. 4.
Figure 6:
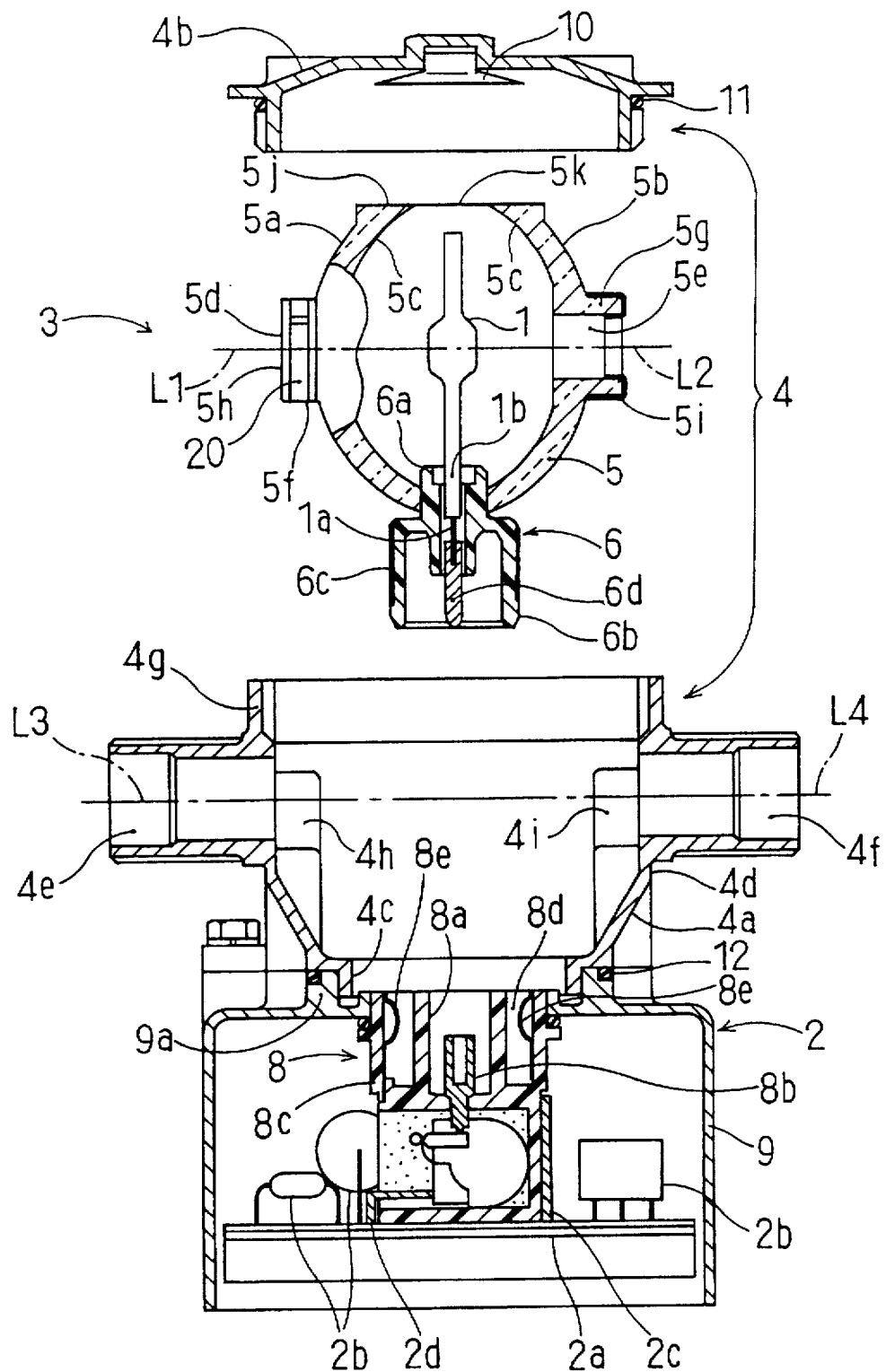
FIG. 6 is an exploded cross-sectional view illustrating the light source assembly shown in as FIG. 4.
Figure 7:
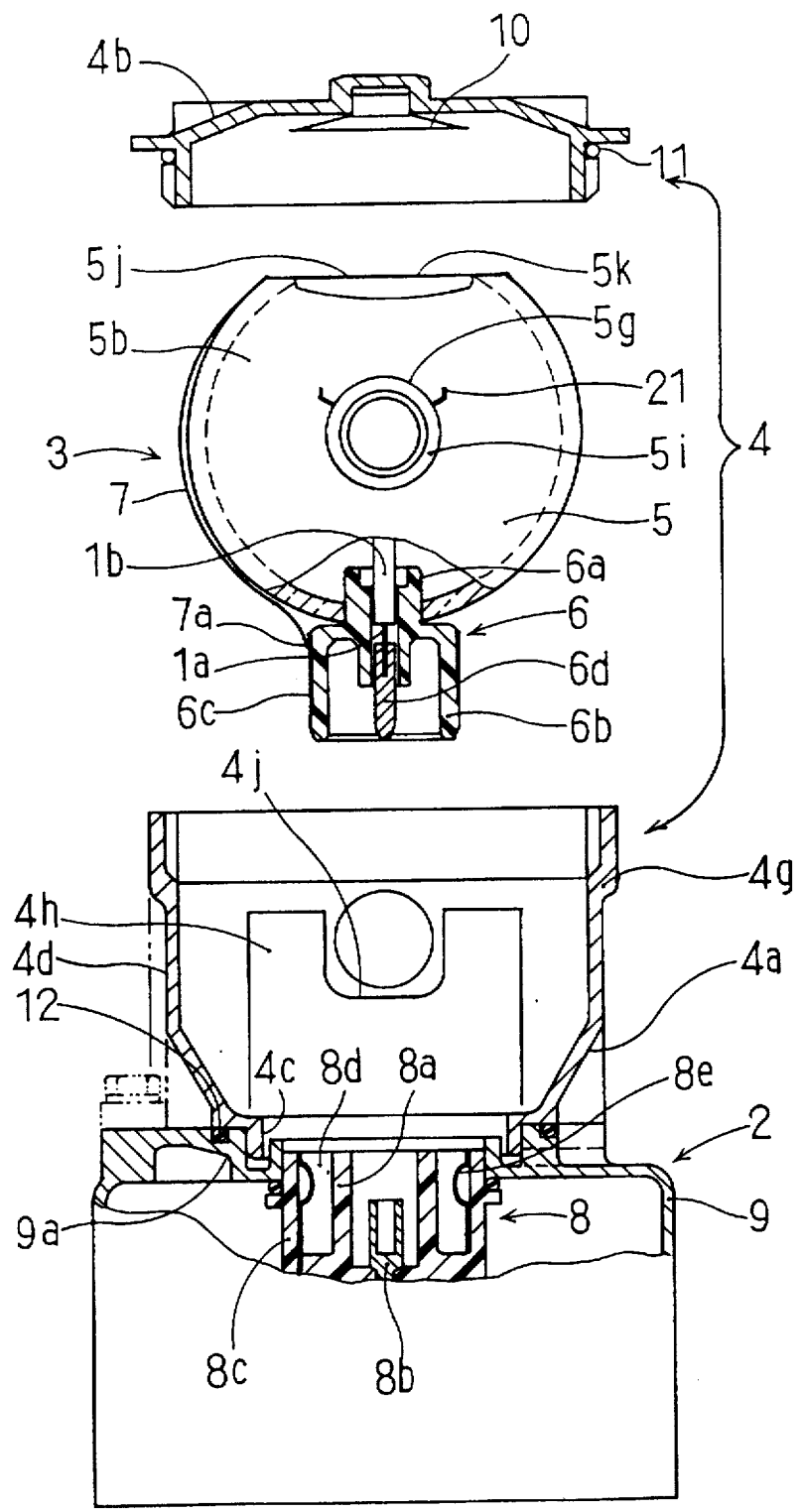
FIG. 7 is an exploded cross-sectional view illustrating the light source assembly shown in FIG. 5.

The housing body 4a is made of an electricity-conductive material such as aluminum in order to shield high frequency noises generated by the bulb. The bottom of the housing body 4a has a lower opening through which the connector 6 of the bulb unit 3 extends and is fitted to a connector 8 of the control circuit 2 which is described later. A portion 4c at the bottom of the housing body 4a is fixed on the upper portion of the control circuit 2. The housing 4a has two cylindrical members 4e and 4f respectively projecting from opposite sides 4d thereof to hold the light incident portions 201a and 202a of the optical cables 201 and 202. The cylindrical members 4e and 4f are disposed to be coaxial with the line L3–L4 as shown in FIG. 3. The housing body 4a has an upper opening for replacing the bulb unit 3, and a cover 4b is fixed by screws or the like at the edge 4g of the upper opening. A pair of stepped supports 4h and 4i are formed inside the housing body 4a and have U-shaped grooves (concave) 4j to support the bottoms of the cylindrical members 5f and 5g of the reflector 5 in the grooves 4j. Each of the cylindrical members 5f and 5g has a spring 20 or 21 on the periphery so that each of the cylindrical members 5f and 5g is retained in the U-shaped groove 4j by the spring action, whereby the reflector 5 is held in the housing body 4a securely. The reflector supports 4h and 4i position the reflector 5 so that the common axis L1–L2 of the light transmitting windows 5b and 5e of the reflector 5 can be in alignment with the axis L3–L4 of the cylindrical members 4e and 4f of the housing body 4a.

The cover 4b is made of an electricity-conductive material such as aluminum to shield high frequency noises and covers the upper opening of the housing body 4a. The cover 4b is fixed to the opening edge 4g of the housing body 4a by a screw or the like. The cover 4b and the housing body 4a are sealed by an O-ring 11.

A generally conical spring plate 10 is disposed inside the cover and partially compressed between the flat portion 5j around the upper opening 5k of the reflector 5 to hold the top of the bulb unit 3. A heat radiation passage (not shown) from the inside to the outside of the reflector 5 is formed between the spring plate 10 and the annular flat portion 5j. Accordingly, the heat generated by the bulb 1 can be radiated to the outside of the reflector 5, thereby suppressing the temperature rise.

The control circuit 2 is composed of the case 9, the connector 8 fixed to the case 9, the connector 8, the high tension coil 56, a circuit board 2a and circuit elements 2b disposed on the circuit board 2a.

The case 9 is made of an electricity-conductive material to shield high-frequency noises generated by the control circuit 2. An upper portion 9a of the case 9 supports the housing body 4a, and an O-ring 12 is disposed between the case 9 and the housing body 4a to seal the gap therebetween. The case 9 has an upper opening, and the connector 8 is fixed to the inner periphery of the upper opening by cement or thee like.

The connector 8 is fixed to the inner periphery of the upper opening of the case 9 by cement or the like. The connector 8 is made of a heat-resistant insulating material such as ceramic and has an inner cup 8a which opens upward to accommodate a female anode terminal 8b of the control circuit 2, which is connected to the high-side output terminal of the high tension coil 56. The low-side terminal of the high tention coil 56 is connected to a printed wire 2d, which is connected to the diode 54 and the capacitor 55 of the control circuit 2. The female anode terminal 8b receives the male anode terminal 6d of the bulb unit 3. The anode terminal 8b of the control circuit and the anode terminal 6d of the bulb unit are connected electrically when they are coupled. The connector 8 has an outer annular wall 8c. An annular groove 8d is formed between the annular wall 8c and the inner cup 8a to receive the cup 6b of the connector 6 of the bulb unit 3. A cathode terminal 8e of the control circuit is fixed on the inner 5 periphery of the outer annular wall 8c. The cathode terminal 8e of the control circuit 2 and the cathode terminal 6c of the bulb unit 3 are electrically connected when they are coupled. The cathode terminal 8e is connected to a printed wire 2c, which is connected to the low-side terminal of the battery through the control circuit 2.

The high tension coil 56 is held in a case, which is formed integrally with the connector body and filled with insulating material such as epoxy resin. The case supports the printed wires 2c and 2d on the periphery thereof.

The connecting structure of the optical cables 201 and 202 is, as shown in FIG. 3, composed of the cylindrical members 4e and 4f of the housing body 4a, inner sleeves 14 and 15 which are inserted into the inside of the cylindrical members 4e and 4f with the optical cables 201 and 202 inside the inner sleeves, outer sleeves 16 and 17 having female screws on the inner periphery thereof in engagement with male screws formed on the outer periphery of the cylindrical members 4e and 4f, flange portions 14a and 15a formed on the outer periphery of the inner sleeves 14 and 15 abut the ends of the cylindrical members 4e and 4f thereby positioning the ends of the optical cables 201 and 202 and stoppers 16a and 17a formed on the inner periphery of the outer sleeves to hold the inner sleeves 14 and 15. O-rings 18 and 19 are respectively disposed between the inner sleeves 14 and 15 and the cylindrical members 4e and 4f.

If the bulb unit 3 is to be replaced,
(i) at first, the optical cable 201 and 202 are taken off the light source assembly 100. That is, the connections of the outer sleeves 16 and 17 and the cylindrical members 4e and 4f of the housing body 4a are loosened to remove the outer sleeves 16 and 17 from the housing body 4a;
(ii) the cover 4b is taken off the housing body 4a; and
(iii) the bulb unit 3 is lifted, and the connector 6 is uncoupled from the connector 8 of the control circuit, thereby taking the bulb unit 3 off the housing body 4a.

When the Bulb Unit 3 is to be installed,
(i) at first, a new bulb unit 3 is inserted into the housing body 4a so that the cylindrical portions 5f and 5g of the bulb unit 3 are accommodated into the U-shaped grooves 4j of the reflector supports 4h and 4i, and the connector 6 is coupled with the connector 8;
(ii) the cover 4b is fixed to the housing body 4a; and
(iii) the light incident portions 201a and 202a of the optical cables 201 and 202 with the inner sleeves 14 and 15 mounted thereon are inserted into the inner sleeves 14 and 15 until the flanges 14a and 15a thereof abut the end surfaces of the cylinder members 4e and 4f, and the outer sleeves 16 and 17 are screwed around the cylindrical members 4e and 4f.

(Second Embodiment)

Figure 12:
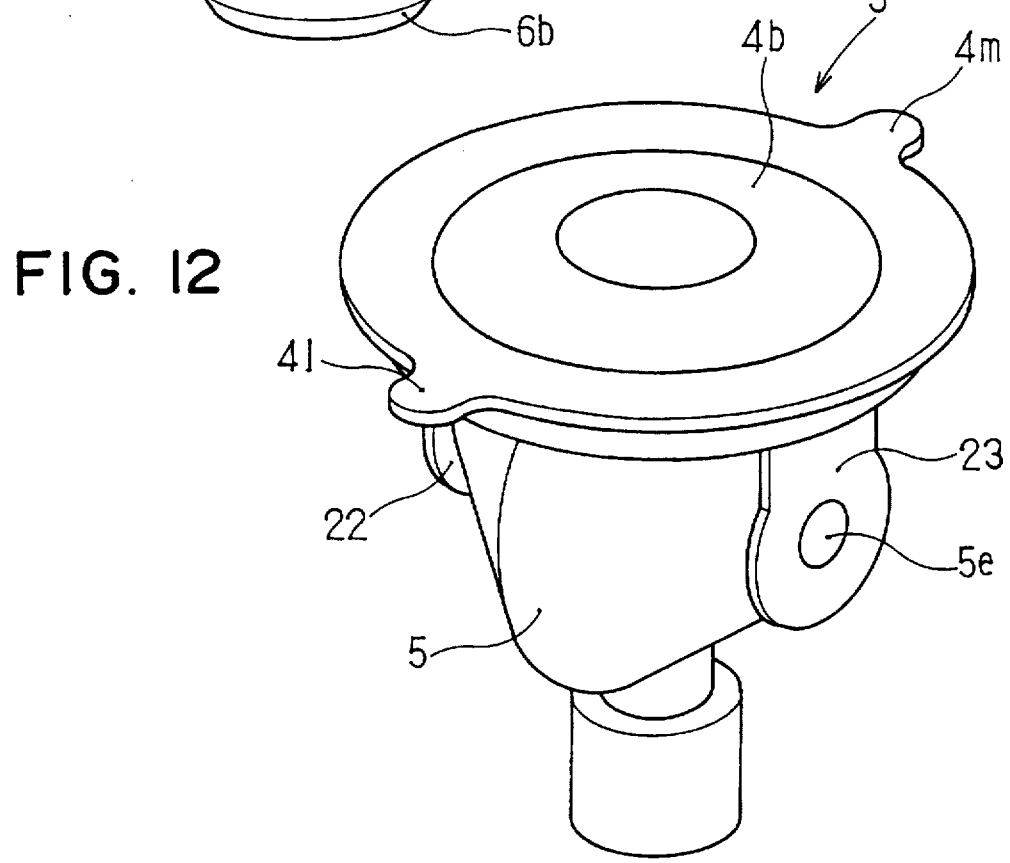
FIG. 12 is a perspective view illustrating a bulb unit as a unit of replacement when the bulb is replaced.
Figure 11:
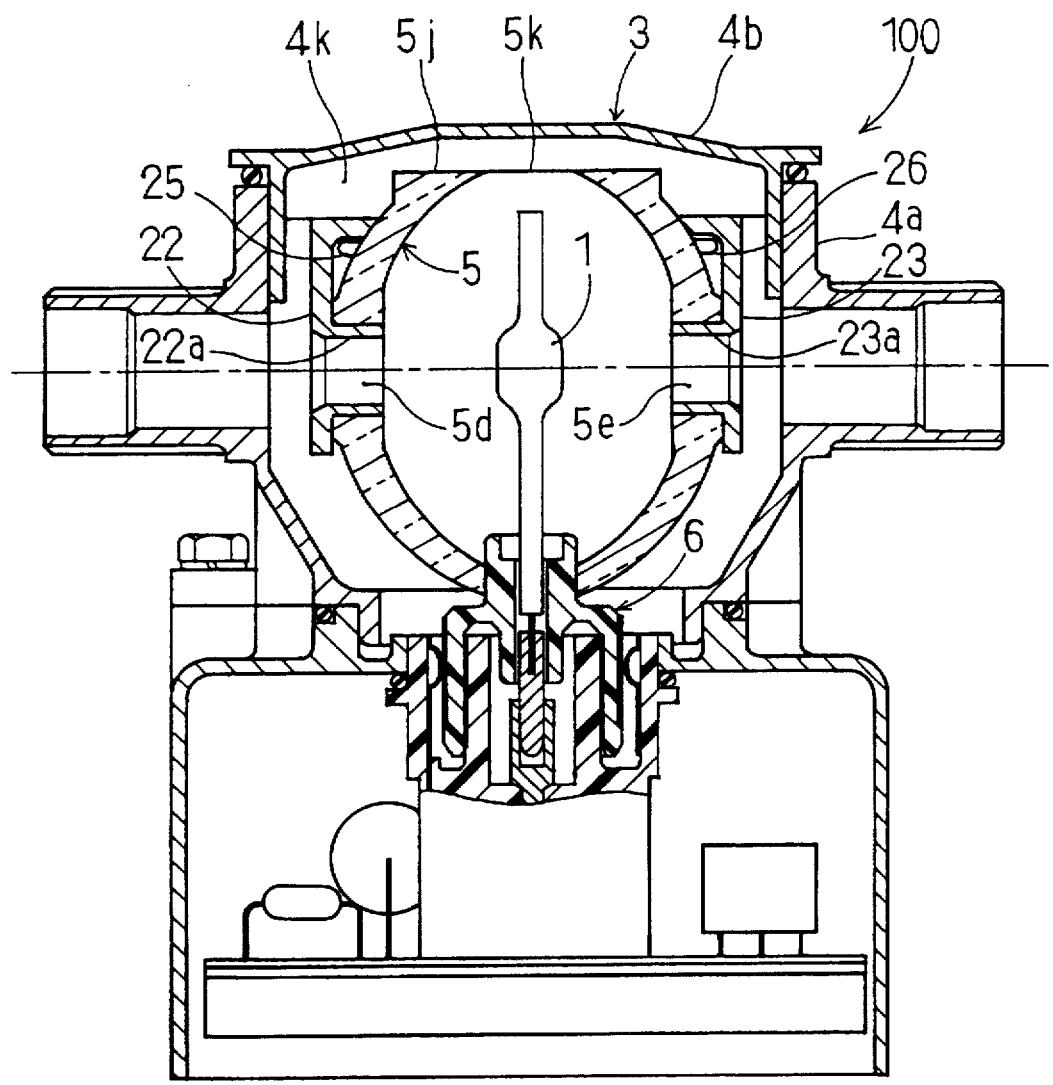
FIG. 11 is a cross-sectional view illustrating a light source assembly according to a second embodiment.

A light source assembly 100 according to a second embodiment of the present invention is described with reference to FIG. 11 and FIG. 12.

The light source assembly 100 has the bulb unit 3, which is composed of the bulb 1, the reflector 5, the connector 6 and the cover 4b. The bulb unit 3 according to the second embodiment is composed of the cover 4b having a fixing portion 4k for fixing the reflector at the bottom thereof and fixing members 22 and 23 which have tubular members 22a and 23a fitted into the light transmitting windows 5d and 5e of the reflector 5, and the fixing portion 4k and the fixing members 22 and 23 are fastened by screws 25 and 26, thereby combining the reflector 5 and the cover 4b in a unit. Numeral references 41 (41) and 4m in FIG. 12 indicate projecting portions for positioning the cover 4b on the housing body 4a. Other portions are the same as that of the first embodiment, and therefore the description is omitted.

The reflector 5 can be replaced only by removing the cover 4b because the cover 4b is integrated into the bulb unit 3. As a result, the bulb can be removed easily, and can be installed only by mounting the cover 4b on the housing body 4a. The reflector 5 is automatically positioned in the housing body 4a, resulting in that the bulb can be installed easily.

(Third Embodiment)

Figure 13:
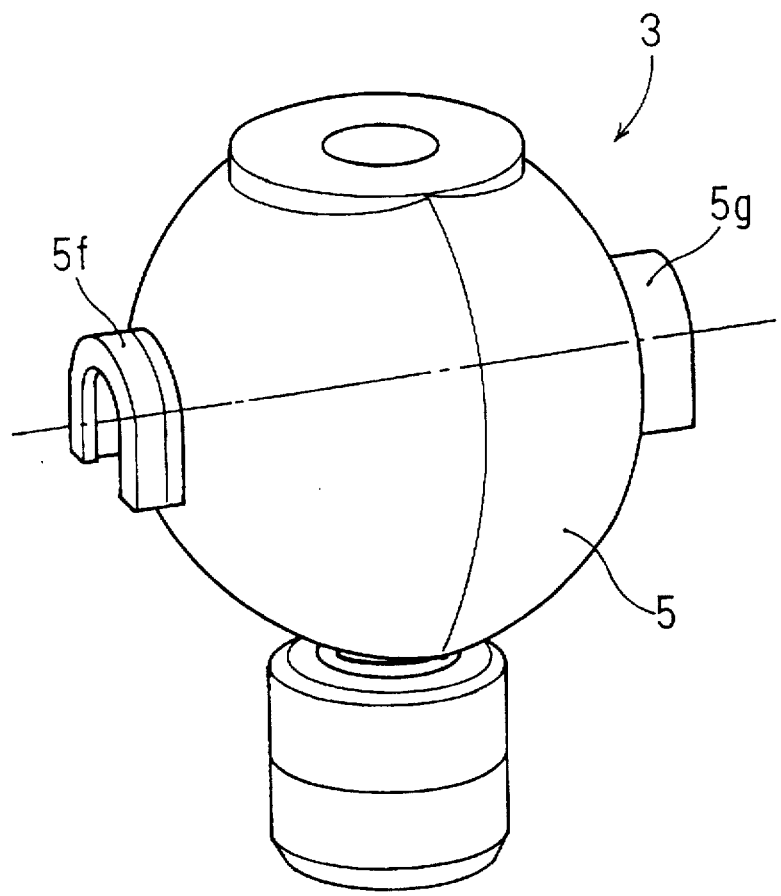
FIG. 13 is a perspective view illustrating a bulb unit of a light source assembly to be replaced according to a third embodiment of the present invention.

FIG. 13 is a perspective view illustrating a bulb unit 3 of a light source assembly 100 to be replaced according to a third embodiment of the present invention.

The bulb unit 3 has inverted U-shaped grooves instead of the cylindrical portions 5f and 5g of the first embodiment. Other portions are the same as those of the first embodiment, and therefore further description is omitted.

The bulb unit 3 can be removed from the housing body 4a without removing the optical cables 201 and 202 from the light source assembly 100, making the replacement of the bulb very easy.

(Fourth Embodiment)

Figure 14:
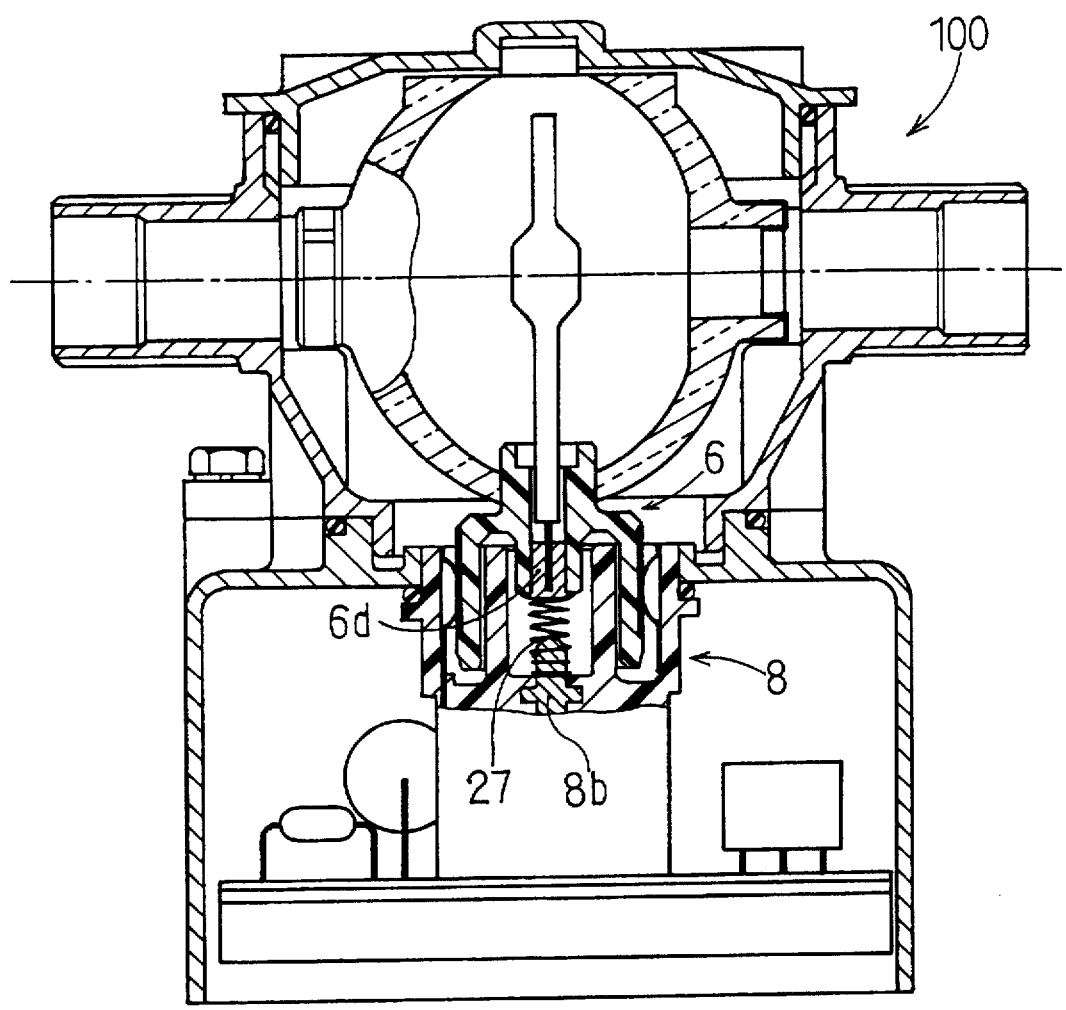
FIG. 14 is a cross-sectional view illustrating a light source assembly according to a fourth embodiment.

FIG. 14 is a cross-sectional view illustrating a light source assembly according to a fourth embodiment.

The anode terminal 6d of the bulb connector 6 and the anode terminal 8b of the control circuit-side connector 8 are connected by a conductive coil spring 27 which has one end pressed on the bulb-side anode terminal 6d and the other end covering the control circuit-side terminal 8b. Other portions are the same as those of the first embodiment and therefore further description is omitted.

The conductive coil spring 27 moderates the dimensional accuracy of the bulb-side anode terminal 6d and the control circuit-side anode terminal 8b as compared with the dimensional accuracy required in the first embodiment and protects both anode terminals 6d and 8b from damage.

(Fifth Embodiment)

Figure 15:
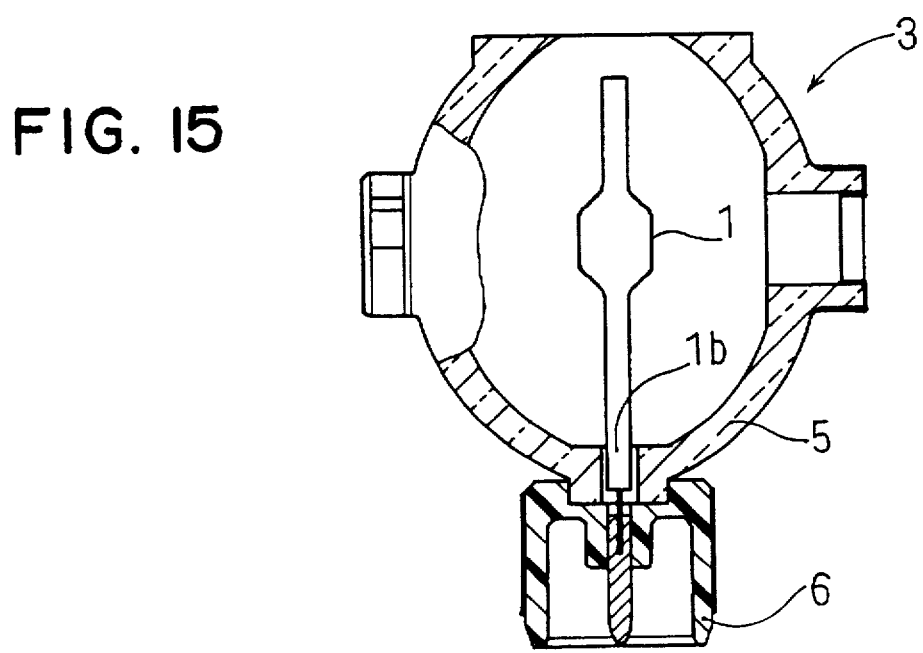
FIG. 15 is a cross-sectional view illustrating a bulb unit of a light source assembly to be replaced according to a fifth embodiment.

FIG. 15 is a cross-sectional view illustrating a bulb unit 3 of a light source assembly 100 to be replaced.

In the bulb unit 3, the glass envelope 1b is bonded to the reflector 5, and the connector 6 is fixed to the outer periphery of the reflector 5. Other portions are the same as the first embodiment, and therefore further description is omitted.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A light source assembly including a control circuit, a bulb unit which is composed of a bulb having an anode and a cathode, a reflector having a light transmitting window, and a first connector fixed to said reflector and an optical cable connected to said light transmitting window for transmitting a light emitted from said bulb to an outside projector, said light source assembly comprising:

a housing made of an electromagnetic shielding material for accommodating said bulb and said reflector, said housing having an opening through which said connector extends;

wherein said control circuit has a second connector detachably coupled with said first connector outside said reflector thereby connecting said control circuit to said bulb.

2. A light source assembly as claimed in claim 1, wherein said reflector comprises a cylindrical portion projecting to the outside from said light transmitting window; and said housing comprises a support for supporting said cylindrical portion inside said housing.

3. A light source assembly as claimed in claims 2 further comprising a protecting ring disposed around said cylindrical portion of said reflector.

4. A light source assembly as claimed in claim 1, further comprising a cover and a spring plate, wherein said housing has an opening for replacement of said bulb;

said reflector has an upper opening for heat radiation and a flat portion around said upper opening;

said spring plate is disposed compressively on said flat portion to cover said opening of said housing so that a radiating passage is formed to connect the inside of said reflector and the outside of said housing.

5. A light source assembly as claimed in claim 1, wherein said first connector has a connector body having inner and outer periphery made of an insulating material, anode and cathode terminals for connecting said anode and cathode of said bulb to said control circuit;

said anode terminal is disposed on said inner periphery of said connector body; and said cathode terminal is disposed on said outer periphery of said connector body.

6. A light source assembly as claimed in claim 1, wherein said reflector is composed of a receptacle made of an insulating material and a nonmetallic reflecting layer formed on the inner periphery of the receptacle.

7. A light source assembly as claimed in claim 1, wherein said control circuit comprises a case for accommodating said second connector.

8. A light source assembly as claimed in claim 7, wherein said control circuit comprises a high tension coil integrally disposed in said case and connected to said second connector.

* * * * *

UNITED STATES PATENT AND TRADEMARK OFFICE
CERTIFICATE OF CORRECTION

PATENT NO. : 5,755,505
DATED : 5/26/98
INVENTOR(S) : Hiramatsu

It is certified that error appears in the above-identified patent and that said Letters Patent is hereby corrected as shown below:

Please add new claim 9:

--9. A light source assembly as in claim 5, wherein said anode terminal is disposed within an end of said connector body.--

Signed and Sealed this

Ninth Day of February, 1999

Attest:

Attesting Officer

*Acting Commissioner of Patents and Trademarks*